No. 786,163. PATENTED MAR. 28, 1905.
G. SCHMITTLE.
TRAP.
APPLICATION FILED OCT. 12, 1904.

2 SHEETS—SHEET 1.

Witnesses
Edwin G. McKee
John F. Byrne

Inventor
George Schmittle
By Victor J. Evans
Attorney

No. 786,163. PATENTED MAR. 28, 1905.
G. SCHMITTLE.
TRAP.
APPLICATION FILED OCT. 12, 1904.
2 SHEETS—SHEET 2.
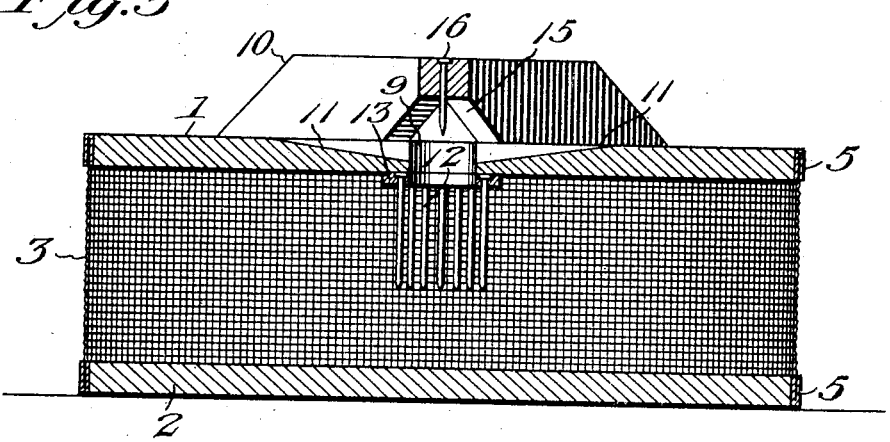
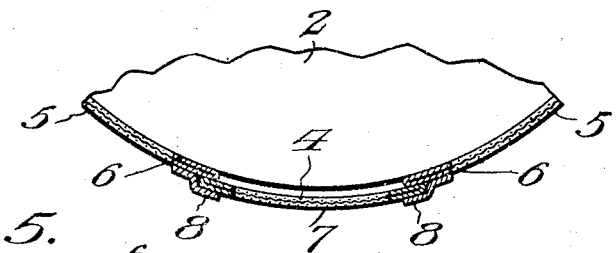
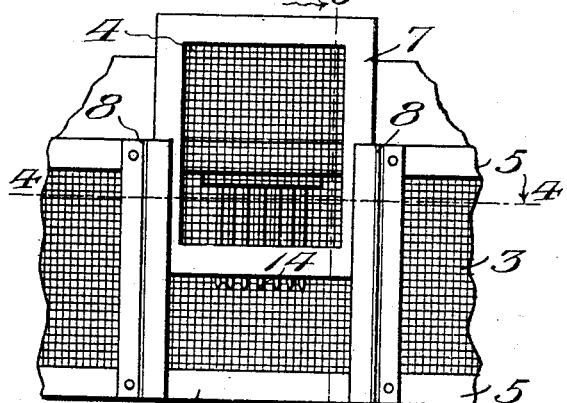
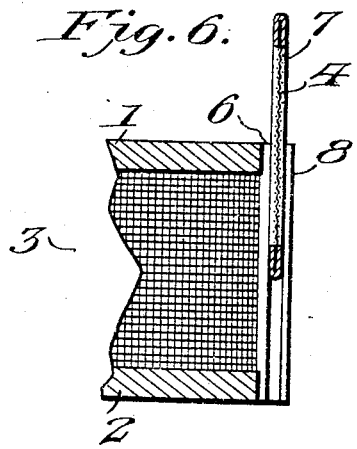
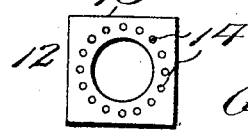
Witnesses
Edwin G. McKee
John F. Byrne
Inventor
George Schmittle
By Victor J. Evans
Attorney No. 786,163.

Patented March 28, 1905.

UNITED STATES PATENT OFFICE.

GEORGE SCHMITTLE, OF ALTOONA, PENNSYLVANIA.

TRAP.

SPECIFICATION forming part of Letters Patent No. 786,163, dated March 28, 1905.

Application filed October 12, 1904. Serial No. 228,210.

*To all whom it may concern:*

Be it known that I, GEORGE SCHMITTLE, a citizen of the United States, residing at Altoona, in the county of Blair and State of Pennsylvania, have invented new and useful Improvements in Traps, of which the following is a specification.

My invention relates to roach-traps, and its primary object is to provide a new and useful device of this character so constructed that a roach will be involuntarily guided in its movements toward the entrance of the trap and to provide means for preventing the escape of the roach after it has once entered the trap.

The invention consists of the construction, combination, and arrangement of parts hereinafter fully described, claimed, and illustrated in the accompanying drawings, wherein—

Figure 1:
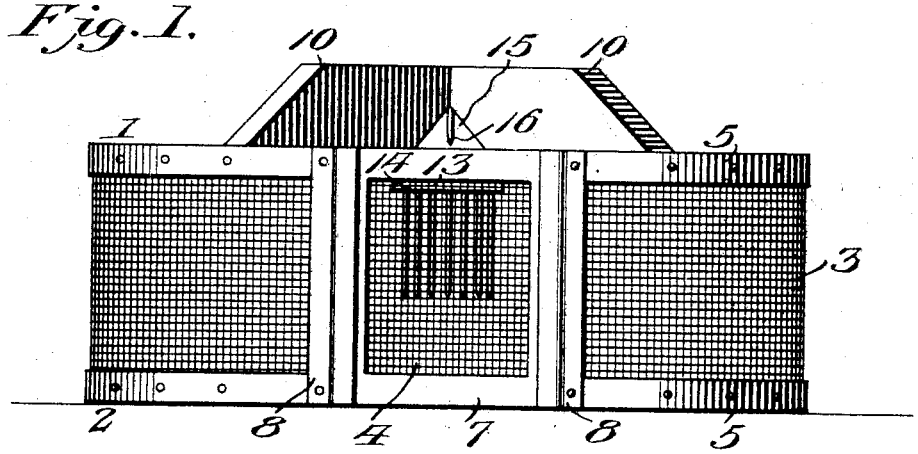
Figure 2:
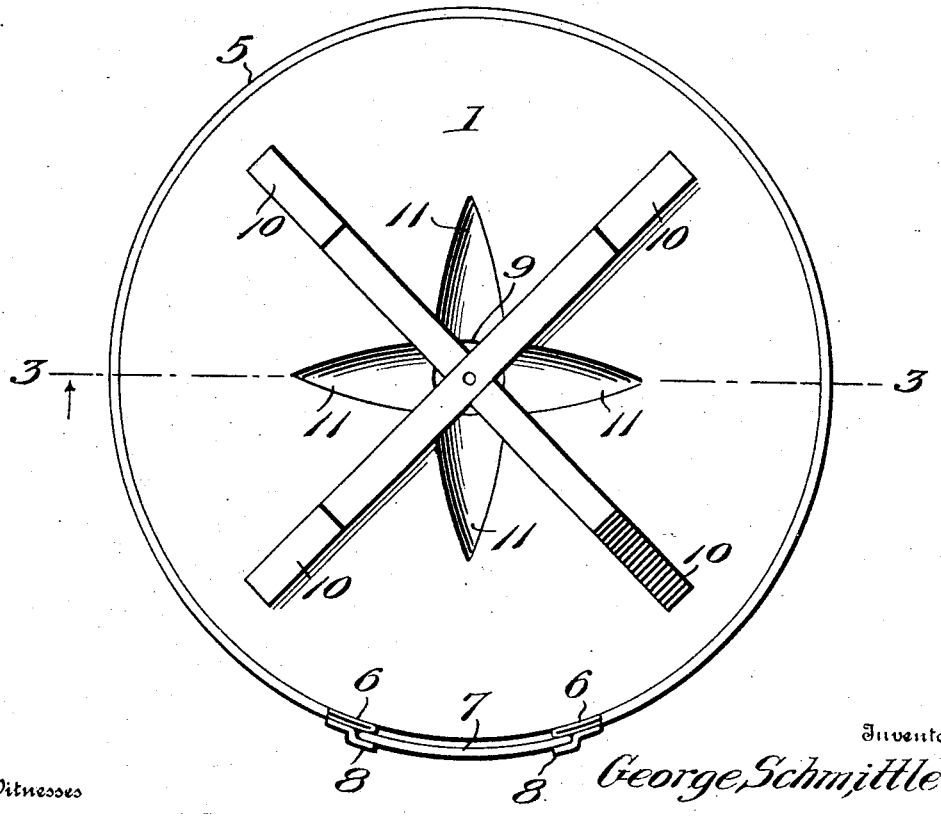

Figure 1 is a side elevation of a trap constructed in accordance with my invention. Fig. 2 is a top plan view thereof. Fig. 3 is a sectional view on the line 3 3, Fig. 2, looking in the direction of the arrow. Fig. 4 is a sectional view on the line 4 4, Fig. 5, looking in the direction of the arrow. Fig. 5 is a fragmentary portion of the front of the trap, the door being shown in position to partially clear the opening in the trap. Fig. 6 is a sectional view on the line 6 6, Fig. 5, looking in the direction of the arrow, and Fig. 7 is a detail top plan view of the guard.

Referring to the drawings by reference-numerals, 1 designates the top, and 2 the bottom, of the trap. Secured to the edges of the top and bottom is a wire-cloth 3, which has the terminal ends thereof spaced apart to provide an entrance adapted to be closed by a removable panel or door 4 and which together with the top and bottom forms the body of the trap. The upper and lower edges and the terminal ends thereof are clamped between channeled securing-strips 5 and 6, respectively, and said wire-cloth is secured in applied position by means of screws or other fastening means passing through the strips 5 and 6 and engaging the edges of the top and bottom. The application of the strips 6 not only secures the terminal ends of the wire-cloth in applied position, but also prevents the top and bottom from having relative movement, and thereby render the body rigid.

The sliding panel or door 4 consists of channeled strips 7, carrying wire-cloth, as clearly illustrated in the drawings. Said panel or door is slidably mounted between strips 6 and guide-plates 8, the latter being secured to the body 1 in vertical alinement with the strips 6 and spaced therefrom a sufficient distance to permit of the door 4 having a free movement. Access may be gained to the interior of the trap by sliding the panel or door 4 to clear the opening formed by the spacing apart of the strips 6.

The top of the trap 1 is provided with a centrally-arranged opening 9 to provide an entrance to the trap. Secured to the top of the trap are two guide-flanges 10, which intersect each other at their centers to divide the top of the trap into compartments, each of which leads to the entrance 9. Grooves 11 are also formed in the top of the trap and radiate and incline upwardly from the entrance 9.

It is apparent that by providing the guide-flanges and grooves 11 the roaches are involuntarily directed in their movements toward the entrance 9 and through virtue of the inclination of said grooves 11 precipitated through the entrance 9 into the body of the trap.

In order to prevent the escape of the roaches from the trap, I arrange a guard 12 about the entrance 9, said guard 12 consisting of a rectangular plate 13, secured to the under side of the top 1 and provided with an opening registering with the opening 9. Secured to said plate 13 are a plurality of depending pins 14, which are so arranged that the roaches may easily enter the trap, but will be prevented from leaving the same thereby. The guide-flanges 10 are cut away at their point of intersection, as disclosed by reference-numerals 15 in Fig. 1 of the drawings, whereby the access to the entrance 9 may be readily had. A pin 16 is secured to the guide-flanges 10 to depend centrally of the entrance 9. The arrangement of this pin 16 will prevent a roach from retrograding after it has moved down one of the grooves 11 sufficiently to position any portion of its body under said pin 16, as such a movement would cause the roach to move upwardly, and thereby bring itself into contact with said pin.

It is apparent from the above description, taken in connection with the accompanying drawings, that I provide a roach-trap so constructed about its entrance that a roach will be involuntarily guided in its movement to the entrance, that I provide means which will effectually prevent a roach from escaping from the trap, and that the manner of securing the wire-cloth to the top and bottom is not only cheap, durable, and efficient, but also prevents the cloth from breaking away from its fastening, as is common when the fastening means are driven directly into the cloth.

Having thus described the invention, what is claimed as new is—

1. A roach-trap having an entrance in the top thereof, and grooves leading toward said entrance.

2. A roach-trap having an entrance in the top thereof, and grooves inclined downwardly toward said entrance.

3. A roach-trap having an entrance in the top thereof, and radial grooves leading toward the entrance.

4. A roach-trap having an entrance in the top thereof, and radial grooves inclined downwardly toward said entrance.

5. A roach-trap having an entrance in the top thereof and grooves arranged about said entrance, guide-flanges secured to the top and a pin secured to said guide-flanges above said opening.

6. A roach-trap having its top provided with an entrance and grooves arranged about said entrance, guide-flanges secured to said top, a pin secured to said flanges and arranged above said opening, and a guard secured to the top about said opening.

7. A roach-trap having an entrance in the top thereof, and radial grooves inclined downward toward said entrance, and guide-flanges secured to said top and intersecting the spaces between the grooves.

8. A roach-trap comprising a top and bottom, said top being provided with an entrance, wire-cloth, channel-strips secured to the edges and terminals of said cloth, said terminals being spaced apart to provide an opening, and a removable panel or door slidably secured in front of said opening.

9. A roach-trap comprising a top and bottom, said top being provided with an entrance and grooves leading thereto, guide-strips secured to said top, means for preventing the escape from the trap, wire-cloth, channeled strips secured to the ends and terminals of said cloth and means for engaging the strips to secure the cloth in applied position.

10. A roach-trap having an entrance in the top thereof, and radial grooves inclined downwardly toward said entrance, guide-flanges secured to said top, and a pin secured to said guide-flanges above said opening.

11. A roach-trap having an entrance in the top thereof, guide-flanges secured to said top, and a pin secured to said guide-flanges above said opening.

In testimony whereof I affix my signature in presence of two witnesses.

GEORGE SCHMITTLE.

Witnesses:
M. G. STRUNK,
A. E. RUSSELL.